United States Patent
Howell et al.

(10) Patent No.: US 11,347,751 B2
(45) Date of Patent: May 31, 2022

(54) SYSTEM AND METHOD FOR ASSOCIATING USER-ENTERED TEXT TO DATABASE ENTRIES

(71) Applicant: MYFITNESSPAL, INC., San Francisco, CA (US)

(72) Inventors: Patrick Howell, San Francisco, CA (US); Chul Lee, San Francisco, CA (US); Hesamoddin Salehian, San Francisco, CA (US)

(73) Assignee: MyFitnessPal, Inc., San Francisco, CA (US)

( * ) Notice: Subject to any disclaimer, the term of this patent is extended or adjusted under 35 U.S.C. 154(b) by 346 days.

(21) Appl. No.: 15/832,111

(22) Filed: Dec. 5, 2017

(65) Prior Publication Data

US 2018/0157664 A1 Jun. 7, 2018

Related U.S. Application Data (60) Provisional application No. 62/431,073, filed on Dec. 7, 2016.

(51) Int. Cl.
| | |
|---|---|
| *G06F 16/2457* | (2019.01) |
| *G06N 7/00* | (2006.01) |
| *G06N 3/08* | (2006.01) |
| *G06N 20/10* | (2019.01) |
| *G06N 3/04* | (2006.01) |
| *G06F 40/20* | (2020.01) |

(52) U.S. Cl.
CPC ........ *G06F 16/24578* (2019.01); *G06F 40/20* (2020.01); *G06N 3/0454* (2013.01); *G06N 3/08* (2013.01); *G06N 7/005* (2013.01); *G06N 20/10* (2019.01)

(58) Field of Classification Search
CPC .......... G06F 17/27; G06N 3/08; G06N 7/005
See application file for complete search history.

(56) References Cited

U.S. PATENT DOCUMENTS

| | | | |
|---|---|---|---|
| 9,659,225 B2 | 5/2017 | Joshi | |
| 10,387,931 B2* | 8/2019 | Lee | .......................... H04L 67/02 |
| 2006/0195440 A1* | 8/2006 | Burges | ................ G06F 16/9535 |
| 2007/0094170 A1* | 4/2007 | Graf | ..................... G06K 9/6269 |
| | | | 706/15 |

(Continued)

OTHER PUBLICATIONS

"The Query Change Model: Modeling Session Search as a Markov Decision Process" by Hui Yang. Published in ACM. (Year: 2015).*

*Primary Examiner* — Ashish Thomas
*Assistant Examiner* — Abdullah A Daud
(74) *Attorney, Agent, or Firm* — Maginot, Moore & Beck, LLP (57) ABSTRACT

System and method for associating user-entered consumable item description to an entry in a consumable item database. In one embodiment, formally structured restaurant menu item is matched to a large database of food items that has been constructed via crowd-sourcing. A novel, practical, and scalable machine learning solution architecture, consisting of two major steps is utilized. First a query generation approach is applied, based on a Markov Decision Process algorithm, to reduce the time complexity of searching for matching candidates. That is then followed by a re-ranking step, using deep learning techniques, to ensure matching quality goals are met.

22 Claims, 7 Drawing Sheets

(56) References Cited

U.S. PATENT DOCUMENTS

| | | | |
|---|---|---|---|
| 2010/0106603 A1* | 4/2010 | Dey | G01C 21/3617 |
| | | | 705/14.63 |
| 2010/0191391 A1* | 7/2010 | Zeng | G01S 13/87 |
| | | | 701/1 |
| 2015/0039292 A1* | 2/2015 | Suleman | G06F 17/3042 |
| | | | 704/9 |
| 2016/0104225 A1* | 4/2016 | Stillman | G06Q 30/0623 |
| | | | 705/26.61 |
| 2016/0188563 A1* | 6/2016 | Radcliffe | G06F 40/205 |
| | | | 704/239 |
| 2016/0328480 A1* | 11/2016 | Owens | G06Q 30/02 |
| 2017/0124616 A1* | 5/2017 | Lee | G06Q 30/0621 |
| 2017/0185912 A1* | 6/2017 | Friggeri | H04L 51/32 |
| 2017/0220575 A1* | 8/2017 | Hohwald | G06N 3/0454 |
| 2017/0255879 A1* | 9/2017 | Chen | G06F 16/90335 |
| 2017/0286639 A1* | 10/2017 | Lee | G06F 19/3475 |
| 2017/0294000 A1* | 10/2017 | Shen | G06T 11/001 |
| 2017/0308790 A1* | 10/2017 | Nogueira dos Santos | |
| | | | G06N 3/0454 |
| 2017/0357877 A1* | 12/2017 | Lin | G06F 16/58 |
| 2018/0004913 A1* | 1/2018 | Ghasemzadeh | G16H 20/60 |
| 2018/0032697 A1* | 2/2018 | Lee | G16H 50/30 |
| 2018/0137137 A1* | 5/2018 | Jin | G06F 16/36 |
| 2018/0189271 A1* | 7/2018 | Noh | G06F 40/30 |
| 2018/0218429 A1* | 8/2018 | Guo | G06F 16/00 |
| 2018/0341839 A1* | 11/2018 | Malak | G06K 9/4628 |
| 2019/0163692 A1* | 5/2019 | Duan | G06F 40/279 |

\* cited by examiner

| Training Size | A Portion of Training Data | | | Hand-labeled Data | | | User-labeled Data | | |
|---|---|---|---|---|---|---|---|---|---|
| | wCNN | cCNN | SVM | wCNN | cCNN | SVM | wCNN | cCNN | SVM |
| 10K | 87.10 | 79.84 | 88.30 | 64.09 | 61.08 | 51.15 | 71.51 | 70.43 | 74.09 |
| 100K | 91.77 | 84.91 | 90.56 | 64.61 | 63.92 | 51.28 | 81.93 | 71.80 | 74.14 |
| 1M | 95.23 | 87.54 | 90.52 | 66.16 | 64.19 | 51.57 | 87.41 | 72.41 | 74.17 |

SYSTEM AND METHOD FOR ASSOCIATING USER-ENTERED TEXT TO DATABASE ENTRIES

PRIORITY

The present application claims priority to co-owned, U.S. Provisional Patent Ser. No. 62/431,073; which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD

This disclosure relates generally to the field of nutrition logging. More particularly, the present disclosure relates to systems, computer programs, devices, and methods for enabling a user-entered consumable item description to be matched to an entry in a consumable item database.

BACKGROUND

In recent years, health and fitness tracking applications that track food consumption have become very popular. Food consumption is important to a healthy lifestyle and is known to be related to various health conditions, such as diabetes and obesity to name a few. Health and fitness tracking applications allow users to set and achieve personalized health goals by tracking the foods and beverages that they consume. These applications enable users to gain insights that help them make smarter choices and create healthier habits.

However, food consumption tracking, even via computerized applications is often a time consuming and detailed process. Hence what is needed are improved methods for tracking or logging consumption data.

SUMMARY

The present disclosure addresses the foregoing needs by disclosing, inter alia, methods, devices, systems, and computer programs for providing a mechanism to associate user-entered consumable item descriptions to database entries, thereby enabling a user to log or track consumption data more efficiently.

In one aspect of the disclosure, method for enabling efficient association of a consumable item to one of a plurality of consumable item records in a database is provided. In one embodiment, the method comprises: (i) receiving at a server apparatus a text input from a user device, the text input comprising descriptive data regarding a consumable item; (ii) using a first machine learning technique to derive one or more queries based at least in part on the text input; (iii) querying the database for a list of possible consumable item records which are determined to comprise descriptive data which matches to the text input using the one or more derived queries; (iv) receiving the list of the possible consumable item records; (v) applying a second machine learning technique to re-rank the list of possible consumable item records to generate a re-ranked list; and (vi) outputting a highest ranked one of the re-ranked list to the user.

In another aspect of the disclosure, a non-transitory, computer readable medium is provided. In one embodiment, the computer readable medium comprises a plurality of instructions which are configured to, when executed, cause a server device to: query a database comprising a plurality of consumable item records for a list of possible consumable item records which are determined to comprise descriptive data which matches to that of a text input received from a user device using one or more queries derived via a first machine learning technique; and apply a second machine learning technique to re-rank a list of possible consumable item records returned in response to the query in order to generate a re-ranked list which identifies a most closely related one of the plurality of consumable item records.

In yet another aspect of the present disclosure, a network apparatus configured to enable efficient association of a desired consumable item to one of a plurality of consumable item records in a database is disclosed. In one embodiment, the apparatus comprises: one or more transceivers; a storage apparatus; and a processor configured to execute at least one computer application thereon, the computer application comprising a plurality of instructions which are configured to, when executed, cause the network apparatus to: (i) receive a text input from a user device, the text input comprising descriptive data regarding the desired consumable item; (ii) query the database for a list of possible consumable item records which are determined to comprise descriptive data which matches to that of the text input using one or more queries derived via a first machine learning technique; (iii) receive the list of the possible consumable item records; (iv) apply a second machine learning technique to re-rank the list of the possible consumable item records in order to generate a re-ranked list which identifies a most closely related one of the plurality of consumable item records; and (v) output the most closely related one of the plurality of consumable item records.

These and other aspects of the disclosure shall become apparent when considered in light of the disclosure provided herein.

All Figures © Under Armour, Inc. 2016. All rights reserved.

DETAILED DESCRIPTION

Disclosed embodiments include systems, apparatus, methods and storage media which associate user-entered consumable item description to an entry in a consumable item database, thereby enabling a user to log or track consumption data more efficiently.

In the following detailed description, reference is made to the accompanying drawings which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). Similar logic applies to the use of the term "or" herein; i.e., "A or B" means (A), (B), or (A and B).

The terms "comprising," "including," "having," and the like, as used with respect to embodiments of the present disclosure, are synonymous.

Exemplary Embodiment

Today's application-driven marketplace often leads to the need to integrate and connect sources of data that have been collected and structured in very different ways. The problem of connecting disparate data is made even more difficult given the nature and characteristics of the specific data discussed herein. Specifically, the present disclosure is centered on a problem of matching short, structured text to items pulled from a much larger set of short, unstructured text data. One proposed solution presented herein is a multistage architecture whereby the structured text is passed through a query generation process and then returned results are re-ranked through a deep learning model, using a convolutional neural network as the basis, to produce a probability vector of whether or not the candidate item is relevant to the query.

The main data that serves as the cornerstone of this analysis is collected through an application that allows users to track exercise, dietary habits, and weight loss. Users keep track of their food choices by entering and logging foods into a personal digital diary. Almost all food data in question—namely, nutritional contents and the text name/description of each item—are sourced only via users' inputs. Due to its crowdsourced nature, the database carries no guarantees of nutritional accuracy, but the application's popularity is such that the database consists of hundreds of millions of food items and tens of billions of individual food entries, offering more data reliability through sheer weight of numbers.

This database alone can provide numerous insights on user eating behavior, in addition, the data may show real-time food matches to users as they are eating, based on their location (as discussed herein). In the real world, this translates to being able to match database foods to restaurant menus, which are tied to geolocation points of the venue. Similar to there being no guarantee of nutritional accuracy, there is also no guarantee that a restaurant's menu item necessarily exists within the application food database, unless a user has specifically added it before. If the given restaurant food item is not found, then the best option is to match the given food item that is semantically closest to the given restaurant food item is provided. This problem is referred to herein as "restaurant food matching".

One might consider that the "restaurant food matching" problem looks similar in nature to previously studied text matching problems, making the application of well-known techniques like locality sensitivity hashing (LSH) (Indyk and Motwani 1998) and/or improved neighborhood-based algorithms (Wang et al. 2009) seem tempting. However, the particular problem presented via "restaurant food matching" differs in that both the given text to be matched (i.e. restaurant menu item) and the matching text in the application database (i.e. food item with its description) are short in length while both the lexical and grammatical structure of each word has a bigger impact on the overall accuracy than would be appreciated using the previously referenced prior techniques. For example, in the problem presented in the present disclosure: "spaghetti sauce" needs to be treated differently from "spaghetti with meat sauce". Word order also has a significant impact on the overall matching accuracy, e.g., "chocolate milk'" must be treated differently than "milk chocolate". Hence, the direct application of any previous text matching solutions is insufficient. Finally, menu text data often comes in a form that is highly structured by possessing information such as the venue's name, menu section name, and the item itself; meanwhile, foods from the crowd-sourced database do not share this same level of consistency, owing to the random noise that accompanies user inputs—misspellings, information in the wrong fields, etc.

One additional and critical requirement for the "restaurant food matching" problem is that its matching speed has to be near-real time in practice and ideally with minimal additional system overhead. To take LSH as an example, there is significant overhead of applying LSH to a large collection of items, especially when one's goal is fast performance on a scale of up to hundreds of concurrent queries. Applying LSH at this scale possesses several challenges: (i) the maintenance of a large number of hash tables to achieve both high precision and recall; (ii) the fact that scaling LSH would require a distributed implementation due to it being a main-memory algorithm; and (iii) there is inherent difficulty in setting up key parameters for LSH to avoid excessive memory consumption or sub-optimal performance (Sundaram et al. 2013).

Thus, there exists a persistent need to provide efficient and easy-to-use mechanisms for enabling a user to enter consumed items into a nutrition log or tracking application. In order to provide for efficient entry thereof, the present disclosure provides a system for enabling user-entered consumable item description to be matched to an entry in a consumable item database as discussed further herein. The proposed solution architecture is highly optimized for scalability while still overcoming the complexity of the herein-described matching problem. Specifically, the solution presented by the disclosure herein breaks the problem into two distinct sub-problems, query generation and re-ranking (as will be discussed in greater detail below).

Network Architecture

Figure 1:
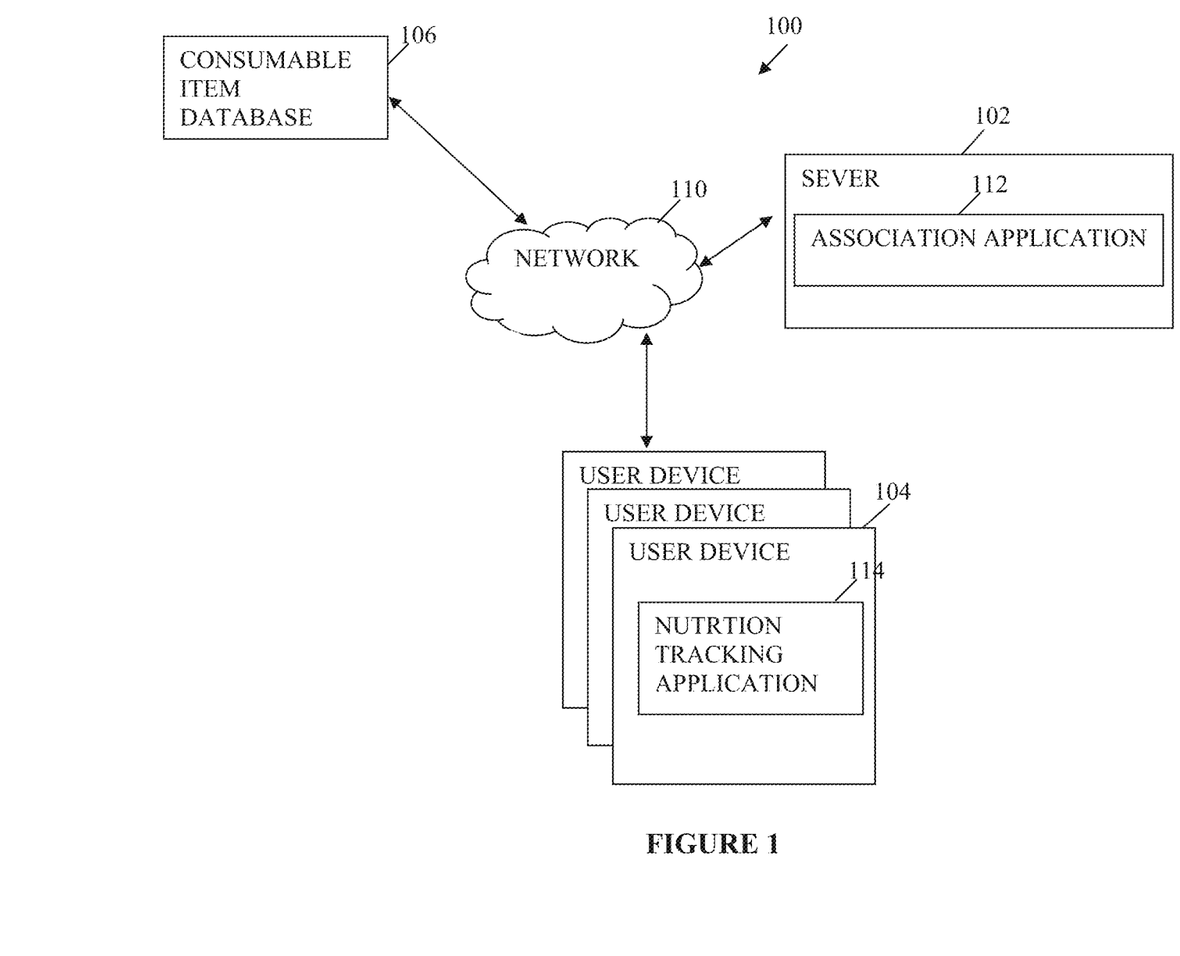
FIG. 1 is a block diagram illustrating an exemplary system for enabling association of user-entered consumable item descriptions in accordance with one embodiment of the present disclosure.

Referring now to FIG. 1, an exemplary system for enabling association of user-entered consumable item descriptions to be matched to an entry in a consumable item database to enable the proposed solution is shown. As illustrated, the system 100 generally comprises a server apparatus 102 in communication with one or more user devices 104 and a consumable item database 106 via a network 110.

The network 110 which enables communication between the server 102, the plurality of user devices 104, and the consumable item database 106 (each discussed in turn below) may comprise one or more wired and/or wireless, private and/or public network, including but not limited to, e.g., the Internet. The network 110 is, for example, a wireless local area network (WLAN), wireless wide area network (WWAN), wired network, or any other suitable communication channel. Accordingly, each of the user devices 104, server(s) 102, and consumable item database 106 are configured with appropriate networking communication interfaces. An example of wired communication interface may include, but is not limited to, Ethernet; while examples of wireless communication interfaces may include, but are not limited to, near field communication (NFC), Bluetooth, WiFi, 4G or 5G LTE. It is further appreciated that various gateways, routers, switches, base stations, and so forth may be involved in facilitating and forwarding communication between the foregoing devices. Additionally, it is noted that the foregoing network may comprise several networks, such that the described components are distributed in various ones thereof. In alternative embodiments, the network may comprise a series of devices communicating within software via software API's.

The user devices 104, in one exemplary implementation, comprise one or more portable computerized devices which are configured to measure, obtain, monitor, generate, collect, sense, or otherwise receive biometric, environmental, activity and/or health parameters. In an exemplary embodiment, the specific health parameter which is obtained comprises a user's eating habits. Hence, the user devices 104 are specifically configured to enable a user to enter one or more consumed items for logging/tracking. User devices 104 may also be referred to herein as health and/or activity monitoring devices, or client devices. In one variant, certain ones of the user devices 104 comprise wearable health-related parameter measurement and computing devices, such as e.g., a smart watch, an activity tracker, a heart rate monitor, a sleep tracking device, a nutrition tracking device, a smart scale, and/or smart eyeglasses. In addition, an exemplary user device 104 may comprise a smartphone having one or more of the foregoing capabilities and/or which enables user entry of the foregoing health data. Alternatively, the user device 104 is in communication with a health and/or activity monitoring device.

The sensed health parameter data comprises data which the particular device 104 is configured to collect (such as activity, biometric, and environmental data). For example, an activity tracking device is configured to collect activity data such as steps taken, distance travelled, rate or pace of a run, and/or flights of stairs climbed, etc.; a heart rate monitor is configured to collect heartbeat data; a sleep tracking device collects data relating to how much time a user/wearer spends sleeping; a nutrition tracking device collects data relating to food and drinks consumed by a user; a smart scale collects data relating to a body weight, body fat percentage, and/or body mass index (BMI), etc. Furthermore, a smartwatch and/or smartphone, may be utilized as an activity tracking device, a heart rate monitor, a sleep tracking device, and/or a nutrition tracking device. The user device 104 may comprise any of the foregoing types of devices and/or may receive collected data from a first device at one or more applications running on the user device 104.

The exemplary user device 104 may be further configured enable entry and/or display of collected data. In such instances, the exemplary user device 104 may run one or more applications configured to process (e.g., transform) the collected data. Exemplary applications include e.g., UA Record™, MapMyFitness®, MyFitnessPal®, Endomondo®, etc. each owned by assignee hereof. Other health activity related monitoring applications may additionally be utilized in connection with the present disclosure, such as those specifically designed to receive information from a particular type of health monitoring device (i.e., an application which is published by the device manufacturer); the foregoing being merely representative of the general concepts of the present disclosure.

Additionally, in one exemplary embodiment the application(s) running at the user device 104 including at least a nutrition tracking data and/or consumption data tracking application 114. The nutrition tracking application 114 is configured to enable a user to track or log consumed items. As noted above, on one embodiment, the nutrition tracking application may comprise the MyFitnessPal® and/or the UA Record™ product owned by the assignee hereof. As discussed in greater detail below, the nutrition tracking application 114 is provided with a mechanism to enable a user to quickly and accurately account for the nutritional content of a consumed item via communication to and/or coordination with a network side application run at the server 102.

The server 102 as illustrated in FIG. 1 comprises one or more computerized devices operable to enable a user at a client device 104 to enter text relating to a consumed item. The text may be entered manually via a keyboard or other device associated to the user device 104, may be spoken into a microphone of the user device 104 and converted to text, or may comprise an uploaded image of text which is recognizable via optical character recognition (OCR). Irrespective of the means used to enter the consumable item data, the server 102 is configured to cause it to be matched to an entry in a consumable item database. To this end, as shown, the exemplary server 102 comprises at least a network-side association application 112. The network-side association application 112 is utilized to provide the aforementioned efficiency and convenience to an existing nutrition tracking application at the user device 104 (i.e., nutrition tracking application 114) as discussed herein. Specifically, the user interfaces with the nutrition tracking application 114 at the user device 104 to enter descriptive text relating to a consumable item, and the network-side association application receives the text and identifies a match thereto within the consumable item database 106, which is pulled for convenient logging at the user device 104. Additional features and components of the server 102 will be discussed in further detail below.

The consumable item database 106 comprises a database or store of data records. The data records comprise detailed descriptive and other nutrition-related information associated to consumable items, which may include single ingredient items (such as fruit, vegetables, etc.) as well as multi-ingredient items (such as recipes, menu items, meals, etc.) and items relating to a restaurant menu (i.e., so called "menu items"). In addition to the nutritional information contained in the data records relating to consumable items, in certain instances the data records may further include one or more images. These records are uploaded to the database 106 from various sources including e.g., individual users (via user devices 104), manufacturers or providers of the consumables represented by the data records (such as restaurants or their representatives), government or other third party databases, etc. To this end, multiple entries may exist for a single consumable item. As will be discussed herein, the present disclosure enables accurate and efficient identification of a best match from among the data records to a user-entered item via the utilization of deep learning and convolutional neural networks (CNN). Then, based on the match, the nutritional information and other details from the matching record are provided to the user to be used in logging/tracking (as discussed below).

It is appreciated that in the illustrated embodiment, the consumable item database 106 comprises a separate entity in communication with server 102 and user device(s) 104. However, in other variants, the consumable item database 106 may be provided in part or in whole to the user device 104 for storage thereat. For example, data records which have been utilized at a particular user device 104 may be stored thereat. Additionally, or in the alternative, the consumable item database 106 (in whole or in part) may be stored at the server 102 and portions thereof may be made accessible to particular devices 104. Any combination of the foregoing configurations may be utilized with equal success.

Figure 1A:
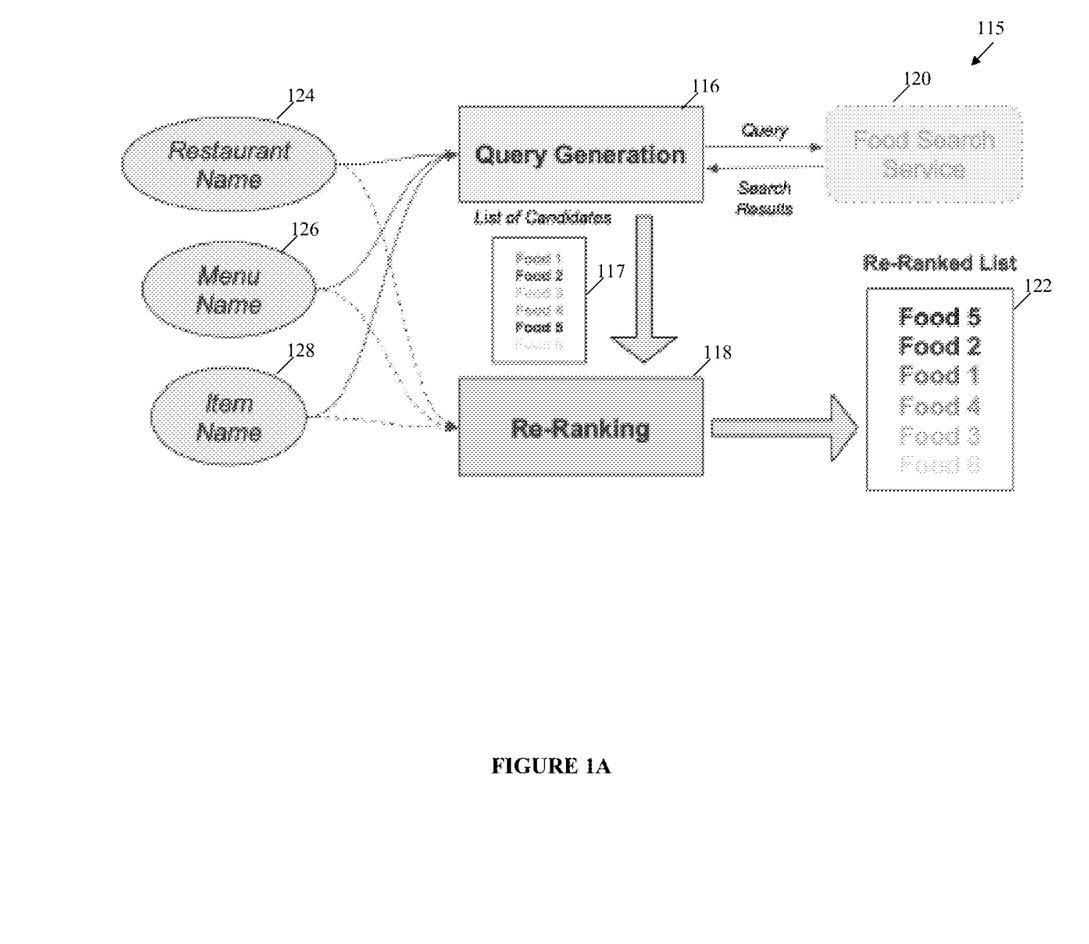
FIG. 1A is block diagram of detailed embodiment of an exemplary server architecture for enabling association of user-entered consumable item descriptions in accordance with another embodiment of the present disclosure.

FIG. 1A illustrates the high-level architecture 115 of the proposed solution. The first step, query generation 116, refers to the candidate set construction for foods to be matched (e.g., restaurant name 124, menu name 126, and item name 128), while the second step, re-raking 118, refers to the selection of the best food item in the given universe of match-possible food items (i.e., search results from the food search service 120) to form a re-ranked list 122.

During the query generation step 116, the complexity to construct the initial candidate set of food items to be matched should be reasonable, even when the overall quality of matching candidate set could end up being sub-optimal. To handle this potential sub-optimality during the initial candidate set construction 117, it is important to employ the most sophisticated/advanced available machine learning technique to achieve the required quality goals and handle the peculiarity of the data. As discussed herein, for both problems, machine learning techniques are employed and experiments are run to compare the proposed approaches against some traditional approaches to show that the proposed solution architecture can outperform the more basic models.

Query Generation Algorithm

As described above, the problem of "restaurant food matching" is decomposed into two sub-problems: (a) generation of matching candidates for the given food item, and (b) re-ranking of the set of candidates based on their similarity with the input restaurant food name. In this section, the algorithm proposed to tackle the first sub-problem is disclosed. At a high-level, the algorithm takes a triplet of strings—the restaurant name 124, menu name 126, and the item name 128—as input and generates the most relevant query (see FIG. 1-1A above). This algorithm is henceforth referred to as Query Generation (QG).

The query refinement problem includes modifying the original query input by a user, based on the search results and users feedback (Maeda et al. 2011; Porkaew and Chakrabarti 1999; Sadikov et al. 2010). The iterative nature of this problem and the partial existence of user feedback make it well-suited for a reinforcement learning framework. The use of Markov Decision Processes (MDP) (Kaelbling, Littman, and Moore 1996) is one technique to address such a problem (Guan, Zhang, and Yang 2013). However, the problem addressed in the present disclosure is substantially different from the classic query refinement, for a number of reasons.

The first challenge relates to the unique and complicated nature of restaurant food names. More specifically, the average length of food names tends to be very short (<20), hence presence or absence of a particular word can be critical when generating the optimum query. This makes it impossible to directly apply any standard term frequency-inverse document frequency (TF-IDF) based techniques (Guan, Zhang, and Yang 2013). Furthermore, restaurants may organize food items on their menus using a variety of different formats. For instance, "Caesar salad" may belong to "appetizers" section in a first restaurant, but belong to a "salads" section in a second restaurant. As a more complicated example, foods may interact differently with section headers, as "Caesar" found under a "Salads and Sandwiches" section may refer to either "Caesar Salad" (e.g., at Panera Bread) or to a "Caesar Sandwich" (e.g., at Subway).

Second, in the present scenario, there is no user interaction data, which is a fundamental component of any reinforcement learning technique. That is to say, in the problem/solution presented herein, users are only provided access to the final re-ranked list of matched food candidates for each restaurant's food; the actual query that was used to retrieve the candidate set is hidden. Therefore, the presently disclosed method is significantly different in nature compared to the standard algorithms for query refinement and session search problems (Guan, Zhang, and Yang 2013; Jiang and He 2013; Carterette, Kanoulas, and Yilmaz 2011).

Pseudo-Relevance Feedback (PRF) methods are one possibility to address the query expansion problem, when no user feedback is available (Manning and Raghavan; Bernhard 2010). However, these methods are not directly applicable to the present disclosure, because typically under PRF a user inputs a query, then the algorithm aims to expand it in an unsupervised manner. In the present disclosure, however, no user input is available even for query initialization, meaning that the initial query is created only based on the restaurant food's name.

In order to tackle the above challenges, an iterative machine learning algorithm is utilized in one embodiment, which is inspired by MDP techniques. Given the set of all words in the combined universe of restaurant names, menu names and food item names, the learning algorithm assigns an optimum weight to each term in a query, in an iterative manner. Decisions to keep or remove each term are then made based on the weights computed. Due to the lack of real user signals in this process, the top K search results in response to the query in each iteration serve as a feedback mechanism to modify the weight vector. The proposed model will be explained in further detail below.

Markov Decision Process (MDP) Algorithm

In one specific embodiment, an MDP setting is proposed such that, the state of the system, q, in iteration k, is the current query string which is passed to the search service. The query string is represented by a set of terms, $t_i$, i.e., $q^{(k)} = \{t_1, t_2, \ldots, t_n\}$. The set of actions, $A = \{a_j\}$, contains keeping, adding or removing terms in, to or from the current query, in order to make a new (and ostensibly more relevant) one. The dynamic of the model is controlled by the transition function $T(q'|q, a_j)$, which defines the probability of taking a certain action $a_j$, to transform current query q to q'. The reward function, $R(q, a_j)$ evaluates each (feasible) action $a_j$, taken on any given query q, and is defined as the maximum relevance score of the search results retrieved in response to the new query, q'. Finally, $y \in [0, 1]$ is the discount factor which controls the importance of the previously visited states. Accordingly, an MDP model aims to find the optimum set of actions made sequentially given an initial state, which is denoted by $V^*(q)$. This optimum strategy is obtained using the Bellman equation (Kaelbling, Littman, and Moore 1996):

$$V^*(q) = \max_{a_j} R(q, a_j) + \gamma \sum_{q'} T(q' \mid q, a_j) V^*(q') \quad \text{Eqn. 1}$$

A Value Iteration (VI) approach (Russell and Norvig 1995) is a solution to an MDP model which may be utilized. Accordingly, given, the reward function (R(.)) defined for each state, and the transition function (T(.)), VI evaluates the utility ($V^*_{i+1}(.)$) at each state in iteration i+1, based on the old utility values (K).

In the current problem, it is intuitively possible to estimate the transition function based on the popularity of each term of the query string in the search results, and specify the probability of moving from one query to another. However, the classic VI technique is not directly applicable to the present disclosure due to extensive time and space complexities involved. Given the initial query of size n, there are $2^n$ possible states in this standard model, which yields to a transition matrix of size $2^n \times 2^n$. Performing computation over such a transition matrix is not feasible in practice.

In an alternative embodiment, based on the idea of "term popularity" an iterative, or so-called "greedy" technique may be used to approximate the optimum strategy in Eq. 1 (above). The proposed technique assigns a weight value to each individual query term. The weights are, in one variant, a measure of popularity of each term in the results set, hence they are updated based on the search results at each iteration. Accordingly, an appropriate action to keep/remove/add terms to the current query is taken. Although, term weighting is popular in session search (Guan, Zhang, and Yang 2013), and information filtering (Nanas et al. 2003), lack of any user feedback makes the approach presented herein considerably different. Stated differently, there currently exists no similar term weighting technique to generate the most relevant query from scratch, without any sort of user feedback loop, and purely based on the returned search results. Moreover, the herein-discussed approach provides performance advantages as discussed herein.

Continuing this example, let $q^{(k-1)} = \{t_1, t_2, \ldots, t_n\}$ be the query word set passed to the search service, at iteration k−1, and let $D^{(k)} = \{d_1, \ldots, d_j\}$ be the document set resulted from the search service in response to $q^{(k-1)}$. Then, the weight vector update equation is written as:

$$\hat{P}(t_i \in q^{(k-1)} \mid D^{(k)}) = \left[\gamma + \sum_{d_j \in D^{(k)}} P(d_j \mid q^{(k-1)}) P(t_i \mid d_j)\right] \quad \text{Eqn. 2}$$

$$P(t_i \in q^{(k-1)} \mid D^{(k-1)})$$

where $P(t_i|D^{(k-1)}) \in [0, 1]$ denotes the weight assigned to the term $t_i$ in the query, once the document set $D^{(k-1)}$ has been observed, and $y \in (0, 1)$ is the discount factor.

Also, $P(d_j|q^{(k-1)}) \in [0, 1]$ represents the relevance score of document $d_j$ to the given query, which may be either computed using any string similarity measure (e.g., Jaccard or Edit distances (Cohen, Ravikumar, and Fienberg 2003)), or may be assigned the relevance score values given by the search service.

Lastly, the term $P(t_i|d_j)$ shows the contribution of the term $t_i$ in document $d_j$, which is usually computed by $$P(t_i \mid d_j) = \frac{\#(t_i, d_j)}{|d_j|},$$

where numerator and denominator denote the frequency of term $t_i$ in document $d_j$, and the length of $d_j$, respectively. According to Eqn. 2, each search result changes the term weights, depending on its total relevance to the entire query. Note that the original ranking of the documents in the search list is not necessarily ideal, at each iteration. Therefore, in one embodiment, the string similarity measures are used, instead of the rank-based scores $$\left(\text{e.g., } \frac{1}{r}, \frac{1}{\log(r) + 1}, \ldots\right)$$

in the update process. Next, the new weight vector obtained from Eqn. 2 is normalized for [0, 1] values.

$$P(t_i \in q^{(k-1)} \mid D^{(k)}) = \frac{\hat{P}(t_i \in q^{(k-1)} \mid D^{(k)})}{\sum_j \hat{P}(t_j \in q^{(k-1)} \mid D^{(k)})} \quad \text{Eqn. 3}$$

Given a triplet of (restaurant name 124, menu name 126, food item name 128), the algorithm initializes $q^{(0)}$ to be the union of all terms in the input triplet, with equal weights. At each iteration, k−1, the query string $q^{(k-1)}$ is sent to the search service, and the list of top K results ($D^k$) is retrieved. In one particular variant, a customized Elastic Search Service which returns a list of relevant documents for each query string, sorted based on the combination of TF-IDF scores and users click history is utilized. Next, the weights corresponding to the terms in $q^{(k-1)}$ are updated using Eqn. 2. Although, all terms in this equation are positive, weights of some terms can become smaller over time, due to the normalization step in Eqn. 3. Once the term weights are updated after each iteration, one of the feasible actions ($a_j$) is taken for each term, based on the new weights. Finally, the algorithm stops when the (Euclidean) distance between the new and old weight vectors is less than a predetermined threshold amount. Although the technique proposed above is an approximate technique to the MDP model in Eqn. 1, its effectiveness and efficiency are shown through experiments with real data (as discussed in greater detail below).

Query Generation Results

Figure 1B:
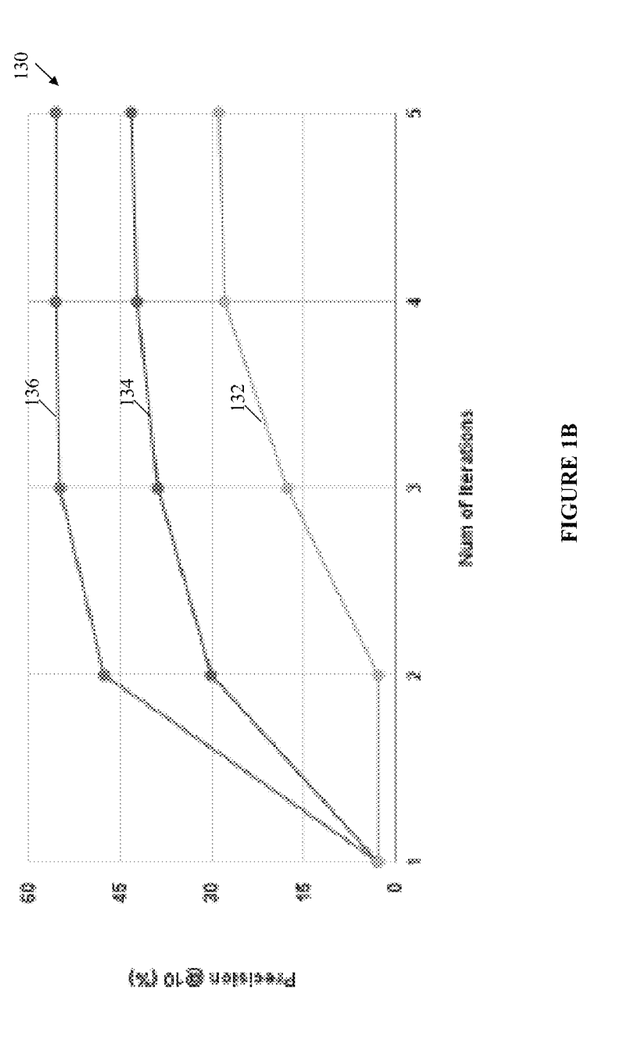
FIG. 1B is a graph illustrating average precision @10 for three MDP models used to enable association of user-entered consumable item descriptions in accordance with one embodiment of the present disclosure.

In one exemplary experiment, 500 items from random restaurants are selected and inputted for QG. Three different values for the document weights are utilized in Eqn. 2: (1) the relevance score between $d_j$ and $q^{(k-1)}$ given by the search service, (2) the rank of the retrieved document, i.e., $$P(d_j | q^{(k-1)}) = \frac{1}{j}, \forall_j,$$

and (3) unweighted, i.e., $P(d_j|q^{(k-1)})=1, \forall_j$. The graph 130 of FIG. 1B demonstrates this comparison. The lowermost curve 132 comprises an unweighted MDP model; the middle curve 134 represents an MDP model weighted based on rank; and the topmost curve 136 represents an MDP model based on relevance score. The average precision for all three models converged after five iterations is shown, so the plots are limited only to the first five iterations. It can be seen that the relevance scores returned by the search service provide the best precision. This is because the relevance scores not only consider the common string similarity measures (i.e., TF-IDF), but also takes the users click/log history into account, which yields to a smarter weighting model.

Re-Ranking

Next, an algorithm to re-rank the match candidates, after retrieving them from the query generation algorithm is provided. The need for quality results from the re-ranking algorithm is high. This is because the re-ranking process needs to also compensate for any quality deficiency that might have occurred during the query generation.

Learning to rank involves the ranking of a set of documents with respect to a given query (Hang 2011; Li 2014). Existing methods generally fall into three main categories, based on the way each learning instance is generated. In the pointwise ranking methods, each pair of (query; doc) is labeled as relevant or irrelevant, and the documents are then sorted with respect to the predicted label and the prediction confidence (Severyn and Moschitti 2015; Crammer, Singer, and others 2001). The pairwise approaches take triplets of the form (query; $doc_1$; $doc_2$), and estimate the probability of $doc_1$ being more relevant to query, compared to $doc_2$. These relative probabilities are then exploited to re-rank the candidates (Herbrich, Graepel, and Obermayer 1999). In the listwise approaches, the query and the entire list of documents are considered as a single learning sample, and the ranking takes place over an entire list of candidates (Cao et al. 2007).

The choice of a suitable feature extraction technique is a fundamental step in any of these re-ranking algorithms. In one approach, input text pairs are encoded using complex lexical, syntactic and semantic features and then various similarity measures between these representations are computed (Li 2014; Mikolov et al. 2013; Severyn and Moschitti 2015). In other embodiments, the final learning quality of a re-ranking algorithm is largely dependent on finding the right representation of input text pairs. In the embodiment presented herein, directly applying previous techniques in the feature extraction task is not as feasible due to the small length of the food names and lack of external knowledge sources.

The advent of Convolutional Neural Networks (CNNs) (LeCun et al. 1998; Krizhevsky, Sutskever, and Hinton 2012) has opened new alternatives for complex, and mostly heuristic, feature engineering tasks, typically applied to image data. In recent years, more CNN-based methods have been proposed for text-based analysis. Taking inspiration from image studies, the concept in general is to transform the input text into an embedding matrix, and then feed this matrix through several convolution layers (Feng et al. 2015; Kim 2014; Yin and Schiitze 2015). Many algorithms in this category are based on a word-level embedding, where a feature vector is assigned to each individual word or a character-level embedding, where an unknown feature vector is assigned to each character (Zhang and LeCun 2015).

In the present embodiment of CNN architecture, however, the structure for the short text matching approaches found in (Severyn and Moschitti 2015) and (Hu et al. 2014) are loosely employed. The proposed architecture is flexible enough to inject both word and character-level embedding. Unlike the character-level embedding presented in (Zhang and LeCun 2015), the solution discussed herein does not encode the characters by pre-defined sparse vectors, instead allowing the embedding to be learned during the training process. The character-level embedding is useful particularly with since the food database 106 is constructed via crowdsourcing and therefore highly susceptible to misspellings. Experimental results using both approaches are provided herein for the sake of comparison.

Re-Ranking Algorithm

An initial effort to address the food re-ranking problem involved a point-wise support vector machine (SVM) algorithm, trained on $v=\phi(q, f)$ instances with relevant or irrelevant labels, where q and f are the query restaurant food and the database food name, respectively, and v is the feature vector extracted via the function $\phi(.)$. The choice of an appropriate feature extraction function, i.e., $\phi(.)$, is a challenge. In one variant, a set of features based on well-known string similarity measures, combined to form a single vector is used. These low level features include Jaccard and Edit distances between different combinations of the restaurant food and the current database candidate. For a query of the form {restaurant name, menu name, item name}, and a database food candidate of type {brand name, description}, the string similarity scores are computed on (restaurant name, brand name), (item name, description), (item name+ menu name, description), etc., and are appended together form a vector of size 28. Although the above SVM technique using a radial bias function (RBF) Kernel provides reasonable accuracy on a small size of training data, it is unable to generalize over larger/more complicated datasets. This is expected, due to the sizable gap between the low-level heuristic feature extraction and high-level semantic complexities involved in the particular problem presented herein.

A CNN architecture is therefore developed herein which is well suited for this application, as it allows the model to learn an optimal representation of input food names together with a similarity function to relate them in a supervised way from a massive database of food names. The large complexity of this particular matching problem is far beyond the capabilities of standard feature extraction tools, as in some cases even a non-expert human might fail to make correct predictions. Moreover, equipped with millions of inputted text food items in the consumable item database, along with 500K restaurant menu-structured items, the herein disclosed CNN is provided with plenty of training data, which is important for any deep learning technique.

The proposed CNN model is based on a pointwise learning approach to assign relevant/irrelevant labels to each pair of restaurant item (query) and food from the database (candidate). The architecture contains two convolution networks that are similar in components, but are trained separately. These networks create two dense feature vectors, corresponding to the query and the candidate. A fully connected layer is then used along with a final softmax layer to combine the dense feature vectors and transform them into a two-length probability vector of relevant/irrelevant. Two different CNN architectures are proposed here for testing, the difference between the two depending on the type of the embedding, whether word-level or character-level. A word-level approach carries a benefit of using a pre-trained embedding model based on a much larger corpus than the CNN models themselves might use in this specialized application. As a counter-point, the character-level architecture is more flexible through its ability to include the embedding process itself directly into the training of the CNN model. Given these differences, a flexible architecture that is able to test both, holding other aspects of the CNN constant is provided herein.

In one specific embodiment, for the word-level embedding CNN (wCNN), a word embedding model such as e.g., Word2Vec (Mikolov et al. 2013) is used to represent each word by a numerical feature vector of size $e=200$. To this end, a model is trained on a larger collected food names corpus with more than 5M unique food items. An input matrix is created by zero padding the number of word columns to a maximum of $L=20$, and truncating a food name if it stretched beyond 20 words. The filter width for the wCNN model is set at $w=3$, or to look at each item in trigram-length windows. Different parameters are necessary for the character-level embedding CNN (cCNN). The main advantage to the cCNN is the ability to learn embedding weights through backpropagation in training. In one specific embodiment, the corpus of characters are limited to the Roman alphabet and a space character, keeping the number of learned embeddings at 27. Each character is assigned to an unknown vector of size $e=10$ that is learned at the time of cCNN training. The maximum number of characters per food name is set to $L=100$, again with zero padding if a word has less than 100 characters, and truncating if a word has more. The filter width for the cCNN is then set to only consider characters in a moving window of 5 neighbors.

Figure 1C:
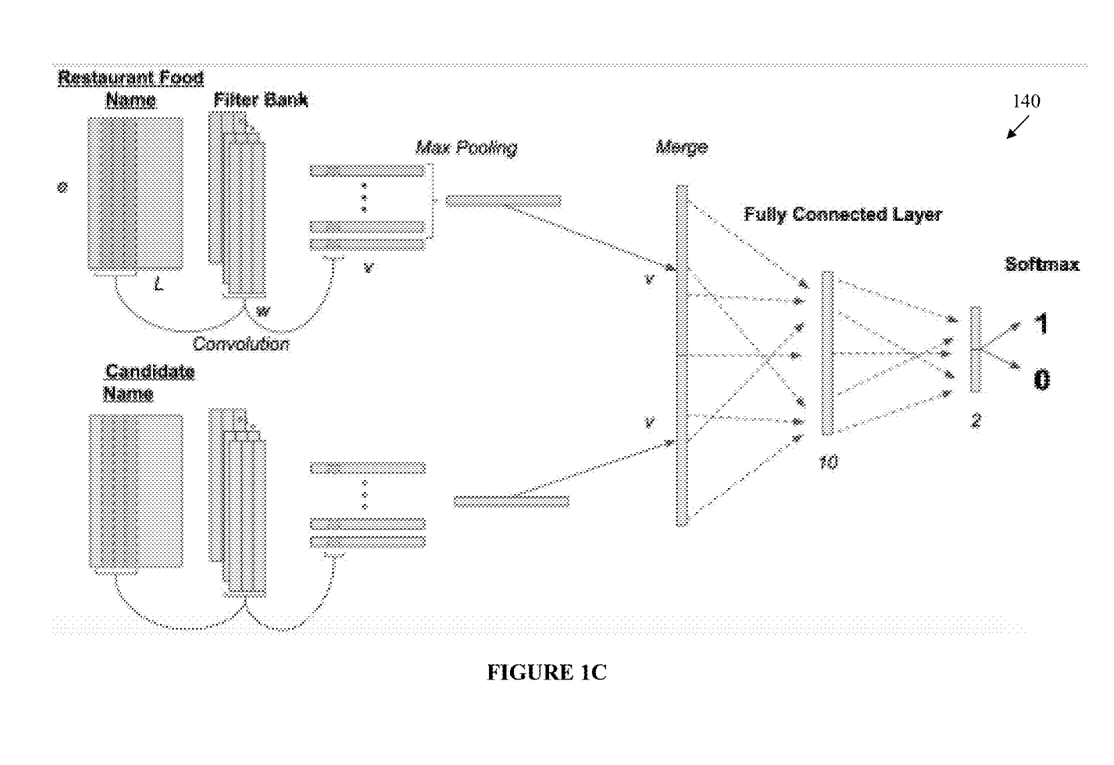
FIG. 1C is an application diagram illustrating an exemplary neural network architecture for enabling association of user-entered consumable item descriptions in accordance with one embodiment of the present disclosure.

As demonstrated in FIG. 1C, the input to each query/match convolution layer is an embedding matrix of size $e \times L$, where e and L are the embedding vector size and the maximum length of the text. In each convolution network 140, there is one convolution layer with $n=50$ filters of size $w \times e$, followed by a rectified linear unit (ReLU) layer. Each convolution filter in the bank outputs a vector of size $v=L-w+1$. Next, the 50 $1 \times v$ vectors generated from the filter bank are max pooled into a single dense vector. Therefore, in both the wCNN and cCNN, the output of the two parallel convolution networks for query and candidate string is a pair of dense feature vectors, each of size $1 \times v$. In order to combine the two dense vectors, the convolution layers are followed by two fully connected (FC) layers. The first layer transforms an input (combined) vector of size $1 \times v$ into a smaller vector of size $1 \times 10$. This vector is further shrunk via the second layer, into a $1 \times 2$ vector. There is one ReLU layer after each FC layer. Finally, a softmax layer is applied on top of this vector to make final probability vector of size 2, where each component correspond to the probability of relevant/irrelevant class membership. The implementation of CNN is carried out using Keras (Chollet 2015) with a backend in Theano. Also, a dropout value of 0:5 is used in both wCNN and cCNN on top of each convolution layer to prevent over-fitting.

Data Collection

In order to optimize any deep learning network parameters, a large amount of training data is required. Collecting necessary data is an important obstacle, because of the uniqueness and complexity of this specific problem. The main challenge in the matching problem presented herein relates to the fact that string/text similarity is not sufficient to assign the correct labels. Food items can look very similar in name, but refer to completely different entities with different nutritional contents, e.g., "spaghetti meat sauce" and "spaghetti with meat sauce". Also, in some cases the food descriptions are not so similar, but the items can be still considered as a true match, e.g., "grilled/marinated lamb or chicken or pork small sandwich" and "grilled lamb sandwich recipe".

To address this problem, in one embodiment, a set of 4K pairs of food names i.e., (restaurant food name, database food name), are generated and hand-labeled by a plurality of experts. The labels assigned to each pair are either relevant (2), somehow relevant (1) or irrelevant (0). This training set is then expanded to a much larger scale, in order to train the CNN parameters. To this end, a pairwise Rank SVM model (Hang 2011) may be applied, because (a) a SVM-based model can achieve a reasonable accuracy on smaller training set, and (b) the pairwise nature of this model allows to make comparisons between relevant and non-relevant labeled instances, and adds more flexibility to the classification task.

The SVM-based data collection involves multiple steps. First, the labeled data, originally pointwise in nature, are transformed to a pairwise set. Let f be the restaurant food name and $c_1$, $c_2$ be two food candidates, with the labels being $y_1$, $y_2$, respectively. Then, a pairwise ranking instance is formed by $((c_1, c_2)|f)$ and is assigned the label $y_1-y_2$, which is positive if $c_1$ is a more relevant match for f, compared to $c_2$, and is negative otherwise. Next, a SVM model is trained on these pairwise instances and employed to make predictions for new instances, along with prediction confidence. The features used in this SVM model are the same as in the pointwise SVM described above.

Equipped with the trained pairwise SVM model, a set of 200K restaurant menus may be processed. To do so, every item, f, is input to the query generation model, and a list of candidates $(c_i, c_2, \ldots, c_n)$ is retrieved from database. Then, the model is used to label $((c_i, c_j)|f)$ with a certain confidence level. This resulted in more than 80M labeled pairs, but evidently not all of which are correctly predicted. Therefore, only the instances which were labeled with %99+ confidence are kept. Each survived pairwise instance, e.g., $((c_i, c_j)|f)$ is then decomposed into two pointwise labeled instances: $(c_i, f) \in$ relevant and $(c_j, f) \in$ irrelevant, if $((c_i, c_j)|f)$ is labeled "positive". Consequently, more than 1M labeled instances are collected, to train the CNN model.

Results

In this section, the performance of the proposed CNN methods and the base SVM algorithm described earlier are compared. A set of 1M labeled samples are collected to train each method. To evaluate the performances, a set of 4K instances are labeled by experts, to form the first test set. A second test set containing 1K instances is created from the implicit feedback of a set of users selecting foods. Items that are frequently logged by users are considered as "relevant" matches for the restaurant food item, while the "irrelevant" matches are the foods that are frequently skipped by users to pick better alternatives. These two test sets are called hand-labeled and user-labeled, respectively. A set of 5-fold validation is carried out for each method over each dataset, and the average accuracy values are reported in the table 150 of FIG. 1D. The leftmost segment of the table 150 shows the accuracy of each technique, when tested over a random partition of the training set. It can be seen that SVM is able to provide a competitive accuracy over 10K samples, but for larger sets the word-level CNN approach outperformed the SVM classifier by wider margins, as expected.

Figure 1D:
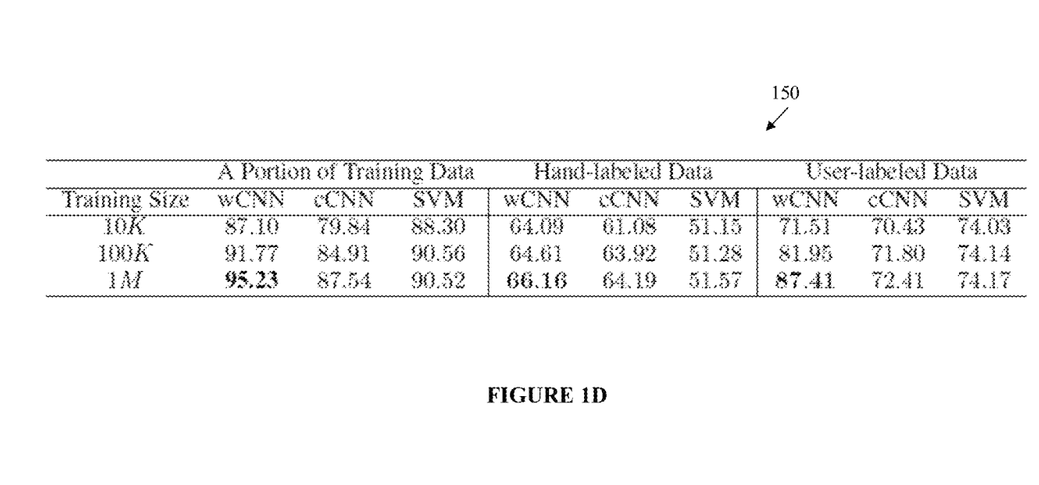
FIG. 1D is a table illustrating an accuracy comparison for enabling association of user-entered consumable item descriptions in accordance with one embodiment of the present disclosure.

Therefore, it is evident that the word-level embedding had the best fit to the training data of size 1M, compared to the competing methods. This is not surprising, as CNN-based approaches are able to learn many more feature complexities via larger training sets, while SVM is limited to the heuristically chosen features, which are independent of the training size. Meanwhile, the cCNN achieves similar accuracy to the wCNN on hand-labeled data, but lags behind SVM on the training and user-labeled experiments. Since cCNN is learning its embeddings at the time of the model training, its weaknesses might be explained from losing the advantage that preprocessing and a larger corpus for embeddings might provide SVM and wCNN, respectively. It is also noted that the food candidates suggested to the users in the baseline flow are originally estimated using the same SVM approach that is used as the baseline comparison. Therefore, the user-labeled data is potentially biased towards the SVM model, which explains the larger accuracy of SVM in this case versus the hand-labeled data experiment (FIG. 1D).

Across the three main variations of test sets—random partition withheld from the training set, hand-labeled data by humans, and observed responses from users—the wCNN model outperforms the basic SVM technique once the scale of training data is on the scale of 100K or more examples, and becomes really evident once the data set size reaches 1M. Since the limitations of this type of food data can make straightforward techniques difficult or impossible, it is impressive that the fusion of multiple machine learning techniques working together can reach accuracy levels higher than any alone would be able to achieve. The combination of reinforcement via MDP for initial query generation, SVM for building synthetic training data, and CNN architectures for learning relevance, all come together to create a powerful tool for short text matching in the absence of context and/or user feedback.

Exemplary methods for enabling a user-entered consumable item description to be matched to an entry in a consumable item database are discussed in further detail below.

Methodology

Figure 2:
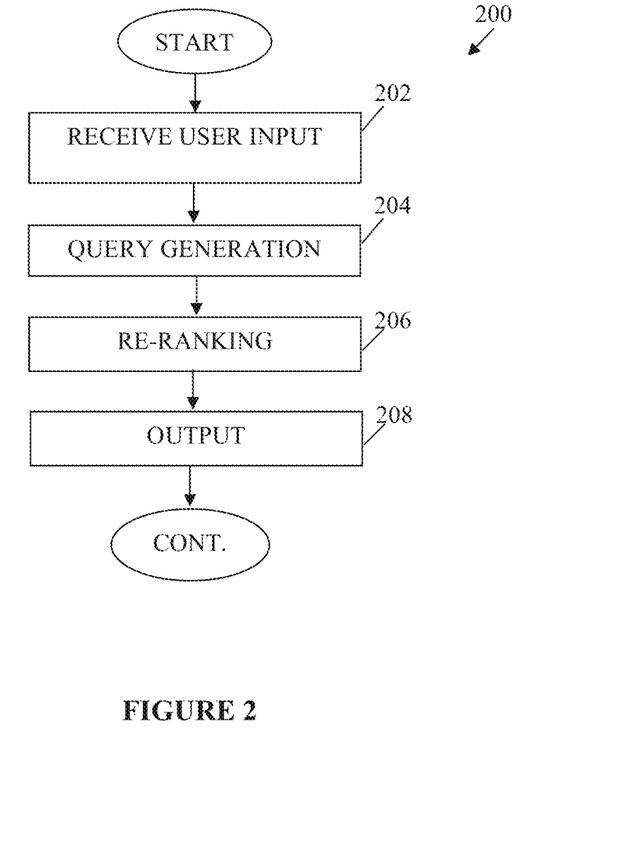
FIG. 2 is a logical flow diagram illustrating an exemplary method for enabling association of user-entered consumable item descriptions in accordance with one embodiment of the present disclosure.

Referring now to FIG. 2, an exemplary method for enabling a user-entered consumable item description to be matched to an entry in a consumable item database is provided. FIG. 2. Provides a high level outline of the steps to be performed. The detail associated to each is discussed above with respect to FIGS. 1-1D.

As shown, per step 202, a user input is received. In one embodiment, the user input comprises a text-based description of a consumable item. The input may comprise text entered by the user into a user device 104, captured via a photograph thereof (subsequently interpreted using OCR techniques), and/or spoken via a microphone apparatus of the client device 104.

Irrespective of the means by which the text is captured, at step 204, a query generation step is next performed on the text. The query generation step 204 in one embodiment comprises querying the consumable item database 106 using a search string. In one variant an independent food search service of the type illustrated in the architecture 115 of FIG. 1A is utilized to perform the search. In one embodiment, the query generation step comprises an iterative machine learning algorithm which is inspired by MDP techniques as discussed above.

The returned list of candidates 117 from the query are then re-ranked per step 206. A CNN using word-level and/or character-level embedding is utilized in one embodiment to perform the re-ranking step as discussed above. A highest matching item is then provided from the re-ranked list 122 for display to the user (step 208).

It is noted that significant portions of the method 200 of FIG. 2, may be performed at the network-side association application 112 of the server apparatus 102. An exemplary server 102 is now discussed with reference to FIG. 3 below.

Exemplary Sever

Figure 3:
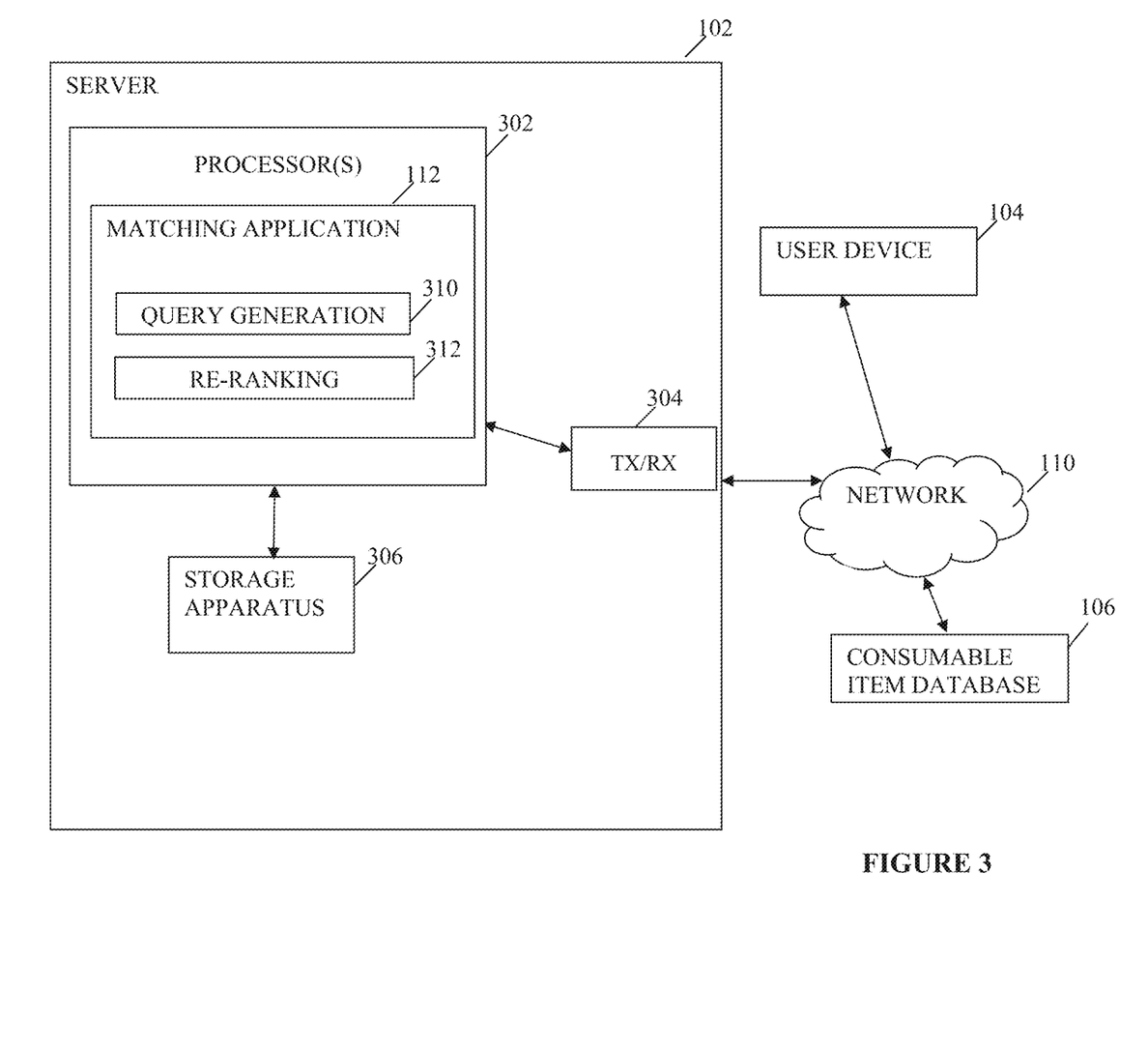
FIG. 3 is a block diagram illustrating an exemplary server device in accordance with one embodiment of the present disclosure.

Referring now to FIG. 3, an exemplary server device 102 is provided. The server 102 may comprise a computerized device having a processor 302, a transceiver 304, and a storage device 306. As discussed in further detail below, the processor 302 is operable to run at least a network-side association application 112 thereon.

The transceiver 304 of the exemplary server 102 illustrated in FIG. 3 enables receipt and transmission of communications to and from the server 102. For example, the transceiver 304 facilitates the receipt of inputs from the user device 104 (e.g., text describing consumable items); and the receipt of data records or a list of candidates 117 from the consumable item database 106. Additionally, the transceiver 304 facilitates transmission to the user devices 104 of the one or more consumable item records which are identified as potentially matching to the recipe details entered by the user.

The storage apparatus 306 of the exemplary server 102 in FIG. 3 is configured to store local copies of e.g., the applications run at the processor 302, local copies of lists of consumable records to be provided to the user device (i.e., the list of candidates 117 and/or the re-ranked list 122), local copies of provided inputs, and/or any other locally created or stored data.

The processor 302 is configured to execute at least a network-side association application 112 thereon. The network-side association application 112 comprises a plurality of instructions which are configured to, when executed by the processor 302, facilitate the identification of one or more consumable item records which most closely match entered text. In one specific embodiment, the network-side association application 112 comprises a plurality of functional applications including: a query generation application 310 and a re-ranking application 312. Each of these will be discussed in turn below.

The query generation application 310 comprises a plurality of instructions which are configured to, when executed by the processor 302, enable the server 102 to generate a search string from the user input text to query the consumable item database 106. In one variant an independent food search service of the type illustrated in the architecture 115 of FIG. 1A is utilized to perform the search and an iterative machine learning algorithm which is inspired by MDP techniques is utilized. A returned list of candidates 117 is then provided from the query generation application 310 to the re-ranking application 312.

The re-ranking application 312 comprises a plurality of instructions which are configured to, when executed by the processor 302, enable the server 102 to re-rank the candidate list 117. In one embodiment, a CNN using word-level and/or character-level embedding is utilized to perform the re-ranking. A highest matching item may then be identified for display to the user.

It is appreciated that the server 102 may comprise additional applications (now shown) which contribute to the functioning thereof as described herein and/or the foregoing functionality may be distributed across more applications or combined into fewer applications. These and other components of the server 102 will be clear to a person of ordinary skill in the art given the discussion of the functionality herein.

The herein-described applications enable a user-entered consumable item description to be matched to an entry in a consumable item database and include e.g., the network-side association application 112, the query generation application 310, and the re-ranking application 312. A permanent copy of the programming instructions for these applications (112, 310, and/or 312) may be placed into permanent storage devices (such as e.g., the storage apparatus 306) during manufacture of the server 102, or in the field, through e.g., a distribution medium (not shown), such as a compact disc (CD), or from a distribution server (not shown) via the network 110. That is, one or more distribution media having an implementation of the agent program may be employed to distribute the agent and program various computing devices.

The herein-described applications (112, 310, and/or 312) improve the functioning of the server 102 by enabling it to provide a means for a user to enter text and receive at least one closest matching consumable item record. Furthermore, devices that are able to enable a user to efficiently enter consumed items as disclosed herein can operate to more effectively enable nutrition logging for the identified consumable item.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

It will be appreciated that the various ones of the foregoing aspects of the present disclosure, or any parts or functions thereof, may be implemented using hardware, software, firmware, tangible, and non-transitory computer readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A method for enabling efficient association of a consumable item to one of a plurality of consumable item records in a crowd-sourced database, said method comprising:
   receiving at a server apparatus a text input from a user device, said text input comprising user-generated descriptive data regarding said consumable item;
   using a first machine learning technique to derive one or more queries based at least in part on said text input, wherein the first machine learning technique includes (i) deriving at least one hidden query based on the text input, (ii) assigning a weight to each term of the at least one hidden query, (iii) obtaining search results based on the hidden query, and (iv) iteratively updating the weights based on the obtained search results, wherein iteratively updating the weights includes iteratively deriving a plurality of old and new weight vectors until a distance between the new and old weight vectors is less than a predetermined threshold amount;
   querying said crowd-sourced database for a list of possible consumable item records which are determined to comprise descriptive data which matches to said text input using said one or more queries;
   receiving said list of possible consumable item records;
   applying a second machine learning technique to re-rank said list of possible consumable item records to generate a re-ranked list, wherein said first machine learning technique and said second machine learning technique are characterized by different training sets and different heuristically chosen features; and
   outputting a highest ranked one of said re-ranked list to said user device.

2. The method of claim 1, wherein said first machine learning technique comprises a Markov Decision Processes (MDP) which is weighted based on relevance.

3. The method of claim 1, wherein said second machine learning technique comprises a Convolutional Neural Network (CNN) using word-level embedding or character-level embedding.

4. The method of claim 1, wherein said user-generated descriptive data regarding said consumable item comprises a title descriptive thereof for a restaurant menu item, wherein the consumable item records include each of a restaurant name, a menu name, and an item name.

5. The method of claim 4, wherein outputting said highest ranked one of said re-ranked list comprises providing a display of a remaining portion of data record.

6. The method of claim 5, wherein said remaining portion comprises nutrition information, ingredient information, or serving size information.

7. The method of claim 1, further comprising enabling said user device to select said highest ranked one of said re-ranked list for logging in a nutrition tracking application, said logging comprising adding one or more nutritional aspects from said highest ranked one into a daily count.

8. A non-transitory, computer readable medium comprising a plurality of instructions which are configured to, when executed by a processor, cause a server device to:
   query a database comprising a plurality of consumable item records for a list of possible consumable item records which are determined to comprise descriptive data which matches to that of a text input received from a user device using one or more queries derived via a first machine learning technique, wherein said one or more queries derived via said first machine learning technique are hidden from said user device, wherein the first machine learning technique includes (i) deriving at least one hidden query based on the text input, (ii) assigning a weight to each term of the at least one hidden query, (iii) obtaining search results based on the hidden query, and (iv) iteratively updating the weights based on the obtained search results, wherein iteratively updating the weights includes iteratively deriving a plurality of old and new weight vectors until a distance between the new and old weight vectors is less than a predetermined threshold amount; and apply a second machine learning technique to re-rank the list of possible consumable item records returned in response to said one or more queries in order to generate a re-ranked list which identifies a most closely related one of said plurality of consumable item records, wherein said re-ranked list generated by said second machine learning technique is provided to said user device.

9. The non-transitory, computer readable medium of claim 8, wherein said first machine learning technique which derives said one or more queries comprises a Markov Decision Process (MDP).

10. The non-transitory, computer readable medium of claim 8, wherein said second machine learning technique which re-ranks said list of possible consumable item records comprises a Convolutional Neural Network (CNN) using word-level embedding or character-level embedding.

11. The non-transitory, computer readable medium of claim 8, wherein said plurality of instructions are further configured to, when executed by said processor, cause said server device to: output data relating to said most closely related one of said re-ranked list to said user device and enable a user to select said most closely related one of said plurality of consumable item records for logging in a nutrition tracking application running at the user device.

12. The non-transitory, computer readable medium of claim 11, wherein said text input comprises a title for a restaurant menu item, and wherein said descriptive data comprises a plurality of data associated to a consumable item including at least each of a restaurant name, menu name, item name, and nutritional information.

13. The non-transitory, computer readable medium of claim 12, wherein said logging at said nutrition tracking application comprises utilization of said nutritional information of said selected most closely related one of said plurality of consumable item records.

14. The non-transitory, computer readable medium of claim 8, wherein said plurality of instructions are further configured to, when executed by said processor, cause said server device to: output said re-ranked list and enables aid user to select any one thereof for logging in a nutrition tracking application running at said user device.

15. A method for associating a consumable item in a crowd-sourced database, the method comprising:

receiving at a server apparatus a text input from a user device;

using a first machine learning technique to derive a hidden query based on the text input, the hidden query including one or more terms;

assigning a weight to each of the one or more terms of the hidden query;

querying the crowd-sourced database using the hidden query;

obtaining search results based on the hidden query, including receiving a list of consumable item records based on the hidden query;

iteratively updating the weights based on the obtained search results, wherein iteratively updating the weights includes iteratively deriving a plurality of old and new weight vectors until a distance between the new and old weight vectors is less than a predetermined threshold amount;

re-ranking the list of consumable item records with a second machine learning technique to generate a re-ranked list; and providing at least one consumable item record from the re-ranked list to the user device;

wherein the first machine learning technique and the second machine learning technique are characterized by different training sets and different heuristically chosen features.

16. The method of claim 15, wherein the first machine learning technique comprises a Markov Decision Process.

17. The method of claim 16, wherein the first machine learning technique further comprises assigning the weight over multiple iterations of the Markov Decision Process.

18. The method of claim 16, wherein the second machine learning technique comprises a first Convolutional Neural Network using word-level embedding.

19. The method of claim 18, wherein the second machine learning technique comprises a second Convolutional Neural Network using character-level embedding.

20. The method of claim 15, wherein providing the at least one consumable item record from the re-ranked list to the user device comprises providing a highest re-ranked consumable item record.

21. The method of claim 15, wherein the second machine learning technique is trained based on synthetic data generated by a third machine learning technique.

22. The method of claim 21, wherein the third machine learning technique comprises a Support Vector Machine algorithm.

* * * * *